(12) United States Patent
Bachmeyer et al.

(10) Patent No.: US 7,578,465 B2
(45) Date of Patent: Aug. 25, 2009

(54) AIRCRAFT FRONT NOSE LANDING GEAR AND METHOD OF MAKING AN AIRCRAFT LANDING GEAR

(75) Inventors: Paul J. Bachmeyer, Cary, NC (US); Doug A. Hodgson, Fuquay-Varina, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 11/038,851

(22) Filed: Jan. 19, 2005

(65) Prior Publication Data

US 2006/0032976 A1 Feb. 16, 2006

Related U.S. Application Data

(60) Provisional application No. 60/537,704, filed on Jan. 20, 2004.

(51) Int. Cl.
*B64C 25/10* (2006.01)

(52) U.S. Cl. .............................. 244/100 R; 244/102 R; 244/102 A

(58) Field of Classification Search .................... 244/50, 244/51, 100 R, 101, 102 R, 102 A, 102 SL, 244/102 SS
See application file for complete search history.

(56) References Cited

U.S. PATENT DOCUMENTS

| | | | |
|---|---|---|---|
| 2,187,923 A | 1/1940 | Winkleman | |
| 2,484,919 A | 10/1949 | Westcott | |
| 2,646,948 A | 7/1953 | Brown | |
| 3,232,597 A | * 2/1966 | Gaydecki | ................... 267/219 |
| 3,399,851 A | 9/1968 | Racca | |
| 3,638,887 A | 2/1972 | Thurston | |

(Continued)

FOREIGN PATENT DOCUMENTS

JP    11-321792    11/1999

(Continued)

OTHER PUBLICATIONS

U.S. Appl. No. 11/956,118 filed on Dec. 13, 2007 by the Cessna Aircraft Corporation.

(Continued)

*Primary Examiner*—J. Woodrow Eldred
(74) *Attorney, Agent, or Firm*—Edward F. Murphy, III

(57) ABSTRACT

An aircraft vehicular front wheel landing gear assembly is provided that includes a nonelastomeric outer upper strut tubular member having an inner axial center bore with a tubular cylindrical frictional interface inner surface segment, and a nonelastomeric inner lower strut member having an outer bonding surface segment. The nonelastomeric inner member is rotationally received in the outer strut member inner axial center bore with the nonelastomeric inner strut member rotatable within said outer strut member. The assembly includes an elastomeric surface effect damper member encompassing the nonelastomeric inner strut member outer bonding surface segment. The elastomeric surface effect damper member has an inner bonding surface segment and an outer elastomer surface, the inner bonding surface segment is bonded to the nonelastomeric inner strut member outer bonding surface segment. The assembly includes a surface effect lubricant disposed between the elastomeric surface effect damper outer elastomer surface and the nonelastomeric outer strut member frictional interface inner surface segment with the elastomeric surface effect damper outer elastomer surface engaging the nonelastomeric outer strut member frictional interface inner surface segment and inhibiting an oscillating shimmy rotation.

6 Claims, 10 Drawing Sheets

U.S. PATENT DOCUMENTS

| | | | |
|---|---|---|---|
| 3,795,390 A * | 3/1974 | Kendall et al. | 267/33 |
| 4,007,894 A * | 2/1977 | Hartel | 244/104 FP |
| 4,088,286 A | 5/1978 | Masclet et al. | |
| 4,105,365 A * | 8/1978 | Ferris et al. | 416/107 |
| 4,284,255 A | 8/1981 | Masclet et al. | |
| 4,291,850 A | 9/1981 | Sharples | |
| 4,328,939 A | 5/1982 | Davies et al. | |
| 4,381,857 A | 5/1983 | Cook | |
| 4,407,396 A * | 10/1983 | Sirven | 188/282.8 |
| 4,537,374 A | 8/1985 | Barnoin et al. | |
| 4,540,142 A | 9/1985 | Veaux et al. | |
| 4,556,179 A | 12/1985 | Veaux et al. | |
| 4,561,612 A | 12/1985 | Masclet | |
| 4,630,788 A | 12/1986 | Veaux et al. | |
| 4,637,574 A | 1/1987 | Handwerk | |
| 4,702,438 A | 10/1987 | Levy et al. | |
| 4,773,514 A | 9/1988 | Gustafsson | |
| 4,821,983 A | 4/1989 | Aubry et al. | |
| 4,907,760 A | 3/1990 | Sealey et al. | |
| 4,925,198 A | 5/1990 | Ito et al. | |
| 4,957,279 A | 9/1990 | Thorn | |
| 4,964,516 A | 10/1990 | Thorn | |
| 4,979,595 A * | 12/1990 | Paton | 188/129 |
| 5,158,267 A | 10/1992 | Pascal | |
| 5,183,137 A | 2/1993 | Siwek et al. | |
| 5,184,465 A | 2/1993 | Howard et al. | |
| 5,230,407 A * | 7/1993 | Smith et al. | 188/281 |
| 5,257,680 A | 11/1993 | Corcoran et al. | |
| 5,299,761 A | 4/1994 | Robin et al. | |
| 5,310,139 A | 5/1994 | Derrien et al. | |
| 5,310,140 A | 5/1994 | Veaux et al. | |
| 5,325,943 A | 7/1994 | Ralph | |
| 5,392,882 A | 2/1995 | Mackovjak et al. | |
| 5,394,589 A | 3/1995 | Braeger et al. | |
| 5,482,260 A | 1/1996 | Schmidt | |
| 5,486,056 A | 1/1996 | Thorn | |
| 5,501,434 A * | 3/1996 | McGuire | 267/140.11 |
| 5,540,457 A | 7/1996 | Johnson | |
| 5,570,762 A | 11/1996 | Jentsch et al. | |
| 5,875,874 A | 3/1999 | Okabe et al. | |
| 6,129,186 A | 10/2000 | Blake, III | |
| 6,179,749 B1 | 1/2001 | Thorn et al. | |
| 6,182,925 B1 | 2/2001 | Kilner et al. | |
| 6,247,687 B1 * | 6/2001 | Jensen et al. | 267/200 |
| 6,290,038 B1 * | 9/2001 | Jensen et al. | 188/381 |
| 6,308,916 B1 | 10/2001 | Hrusch | |
| 6,328,259 B1 | 12/2001 | Bolukbasi | |
| 6,345,564 B1 | 2/2002 | Kilner et al. | |
| 6,371,263 B1 | 4/2002 | Hoose | |
| 6,386,528 B1 | 5/2002 | Thorn et al. | |
| 6,471,229 B2 | 10/2002 | Stewart | |
| 6,481,668 B2 | 11/2002 | Grossman | |
| 6,520,493 B2 | 2/2003 | Larsen | |
| 6,575,405 B2 | 6/2003 | Bryant et al. | |
| 6,609,682 B2 | 8/2003 | Rogers | |
| 6,672,575 B2 * | 1/2004 | Flower et al. | 267/205 |
| 6,676,076 B1 | 1/2004 | Davies | |
| 6,805,320 B2 | 10/2004 | Derrien et al. | |
| 6,811,116 B1 | 11/2004 | Briancourt | |
| 6,824,100 B1 | 11/2004 | Cheetham | |
| 2003/0110880 A1 | 6/2003 | Tison et al. | |
| 2006/0032976 A1 * | 2/2006 | Bachmeyer et al. | 244/104 R |
| 2006/0278755 A1 * | 12/2006 | Bachmeyer et al. | 244/50 |

FOREIGN PATENT DOCUMENTS

| | | |
|---|---|---|
| WO | WO 91/01457 | 2/1991 |
| WO | WO 93/13333 | 7/1993 |

OTHER PUBLICATIONS

"Suggestion of Interference" filed on Apr. 9, 2008 by Cessna in U.S. Appl. No. 11/956,118, and Declarations of Nicholas V. Anderson and Darrin M. Jones filed therewith.

Protest Under 37 CFR §1.291 and associated papers filed concurrently herewith by the Lord Corporation in Cessna's U.S. Appl. No. 11/956,118.

Documents from Lord's files which contain the exhibits attached to Cessna's Anderson and Jones Declarations (6 pages comprising 3 documents, i.e., pp. 1-4, 5, and 6).

Equilibrium, Stability, and Damping [Ch. 10 of See How it Flies] 1996-2001, pp. 1-10 United States of America.

Europa Aircraft, Nose Wheel Shimmy Damper Issue 1, pp. 1-2, Sep. 2001.

Loberg, B., Wobble!, Aug. 29, 2000, pp. 1-5 United States of America.

Lord Corporation, Background Information on Shimmy Problems, Apr. 1999, pp. 1-2, United States of America.

Lord Corporation, Damper Stops Wheel Wobble, As seen in Design News, Sep. 3, 2001, United States of America.

Lord Corporation, General Aviation Shimmy Damper, Aerospace, pp. 1-2, 2003, United States of America.

Lord Corporation, Shimmy Damper FAQ, Aerospace, pp. 1-2, United States of America.

Main Landing Gear, Integrated Publishing, pp. 1-4 United States of America.

Morrison et al., Aircraft Landing Gear Simulation and Analysis, 1995 Session 1620, pp. 1-8, Chicago, IL.

Sacramento Sky Ranch, Cessna Nose Wheel Shimmy, 2003, pp. 1-3.

Somieski, Shimmy Analysis of Aircraft Landing Gears, pp. 1-13.

Somieski, Shimmy Analysis of a Simple Aircraft Nose Landing Gear Model Using Different Mathematical Methods, pp. 1-10.

Mar. 16, 2009 email from M. Honeyman to M. Klee.

Mar. 12, 2009 "Joint Declaration by Nicholas V. Anderson and Darrin M. Jones" and Exhibits A and B thereto.

Apr. 24, 2009 email from M. Honeyman to M. Klee.

Apr. 23, 2009 "Request to Expedite Declaration of Interference Due to Allowance of Lord's Applications . . . " with Exhibits A-J thereto.

* cited by examiner

AIRCRAFT FRONT NOSE LANDING GEAR AND METHOD OF MAKING AN AIRCRAFT LANDING GEAR

CROSS REFERENCE

This application claims the benefit of, and incorporates by reference, U.S. Provisional Patent Application No. 60/537,704 filed on Jan. 20, 2004.

FIELD OF THE INVENTION

The present invention relates to an aircraft front nose landing gear and a method of making an aircraft front nose landing gear. More particularly the invention relates to aircraft landing gear with reduced oscillating shimmy rotation vibrations and methods for making a landing gear with a shimmy damper for reducing oscillating rotations.

BACKGROUND OF THE INVENTION

There is a need for an effective and economical means for making aircraft landing gear with improved performance and reliability. There is a need for economically feasible aircraft landing gear with a shimmy damper. There is a need for a robust system and method of making an aircraft landing gear shimmy damper for inhibiting oscillating rotations.

SUMMARY

The invention includes an aircraft vehicular front wheel landing gear assembly. The landing gear assembly includes a nonelastomeric outer upper strut tubular member having an inner axial center bore with a tubular cylindrical frictional interface inner surface segment. The landing gear assembly includes a nonelastomeric inner lower strut member having an outer bonding surface segment. The nonelastomeric inner member is rotationally received in the outer strut member inner axial center bore with the nonelastomeric inner strut member rotatable within said outer strut member. The landing gear assembly includes an elastomeric surface effect damper member encompassing the nonelastomeric inner strut member outer bonding surface segment. The elastomeric surface effect damper member has an inner bonding surface segment and an outer elastomer surface. The elastomeric surface effect damper inner bonding surface segment is bonded to the nonelastomeric inner strut member outer bonding surface segment. The landing gear assembly includes a surface effect lubricant disposed between the elastomeric surface effect damper outer elastomer surface and the nonelastomeric outer strut member frictional interface inner surface segment with the elastomeric surface effect damper outer elastomer surface engaging the nonelastomeric outer strut member frictional interface inner surface segment and inhibiting an oscillating shimmy rotation of the nonelastomeric inner lower strut member.

The invention includes a method of making an aircraft vehicular front wheel landing gear assembly. The method includes providing a nonelastomeric outer upper strut tubular member having an inner axial center bore with a tubular cylindrical frictional interface inner surface segment. The method includes providing a nonelastomeric inner lower strut member rotationally receivable in the outer strut member inner axial center bore with the nonelastomeric inner strut member rotatable within said outer strut member. The nonelastomeric inner lower strut member has an outer bonding surface segment. The method includes bonding an elastomeric surface effect damper member to said nonelastomeric inner strut member outer bonding surface segment, with said elastomeric surface effect damper member having an outer elastomer surface distal from said nonelastomeric inner strut member outer bonding surface segment. The method includes rotationally receiving said nonelastomeric inner strut rotationally receivable member in said outer strut member inner axial center bore with said nonelastomeric inner strut member rotatable within said outer strut member with said elastomeric surface effect damper outer elastomer surface engaging said nonelastomeric outer strut member frictional interface inner surface segment and inhibiting an oscillating shimmy rotation of said nonelastomeric inner lower strut member.

The invention includes a method of making a shimmy damper for damping a rotating oscillation. The method includes providing a nonelastomeric outer upper tubular member having an inner axial center bore with a tubular cylindrical frictional interface inner surface segment. The method includes providing a nonelastomeric inner lower member rotationally receivable in said outer member inner axial center bore with said nonelastomeric inner member rotatable within said outer member. The nonelastomeric inner member has an outer bonding cylindrical surface segment. The method includes bonding an elastomeric surface effect damper member to said nonelastomeric inner member outer bonding cylindrical surface segment, with said elastomeric surface effect damper member having an outer grooved elastomer surface distal from said nonelastomeric inner member outer bonding cylindrical surface segment. The method includes rotationally receiving said nonelastomeric inner member in said outer member inner axial center bore with said nonelastomeric inner member rotatable within said outer member with said elastomeric surface effect damper outer grooved elastomer surface engaging said nonelastomeric outer member frictional interface inner surface segment and inhibiting an oscillating shimmy rotation of said nonelastomeric inner member.

The invention includes a shimmy damper for damping a rotating oscillation. The shimmy damper includes a nonelastomeric outer upper tubular member having an inner axial center bore with a tubular cylindrical frictional interface inner surface segment and a nonelastomeric inner lower member having an outer bonding cylindrical surface segment with the nonelastomeric inner member rotationally received in the outer member inner axial center bore with the nonelastomeric inner member rotatable within said outer tubular member. The shimmy damper includes an elastomeric surface effect damper member encompassing said nonelastomeric inner member outer bonding cylindrical surface segment, said elastomeric surface effect damper member having an inner bonding cylindrical surface segment and an outer grooved elastomer surface, said elastomeric surface effect damper inner bonding cylindrical surface segment bonded to said nonelastomeric inner member outer bonding cylindrical surface segment. The shimmy damper includes a surface effect lubricant, said surface effect lubricant disposed between said elastomeric surface effect damper outer grooved elastomer surface and said nonelastomeric outer member frictional interface inner surface segment with said elastomeric surface effect damper outer grooved elastomer surface engaging said nonelastomeric outer member frictional interface inner surface segment and inhibiting an oscillating shimmy rotation of said nonelastomeric inner member.

The invention includes a method of making a rotating oscillation damper for damping a rotating oscillation. The method includes providing a nonelastomeric outer tubular member having an inner axial center bore with a tubular cylindrical frictional interface inner surface segment. The method includes providing a nonelastomeric inner member rotationally receivable in said outer member inner axial center bore with said nonelastomeric inner member rotatable within said outer member, said nonelastomeric inner member having an outer bonding cylindrical surface segment. The method includes providing an elastomeric surface effect damper member mold for receiving said nonelastomeric inner member, said mold including an outer surface groove relief distal from said nonelastomeric inner member outer bonding cylindrical surface segment. The method includes providing an elastomer and molding said elastomer to said nonelastomeric inner member inside said mold to provide an elastomeric surface effect damper member bonded to said nonelastomeric inner member outer bonding cylindrical surface segment, with said elastomeric surface effect damper member having an outer grooved elastomer surface distal from said nonelastomeric inner member outer bonding cylindrical surface segment. The method includes rotationally receiving said nonelastomeric inner member in said outer member inner axial center bore with said nonelastomeric inner member rotatable within said outer member with said elastomeric surface effect damper outer grooved elastomer surface engaging said nonelastomeric outer member frictional interface inner surface segment and inhibiting an oscillating rotation of said nonelastomeric inner member. The invention includes making a rotating oscillation damper by providing a nonelastomeric outer tubular member having an inner axial center bore with a tubular cylindrical frictional interface inner surface segment, providing a nonelastomeric inner member rotationally receivable in said outer member inner axial center bore with said nonelastomeric inner member rotatable within said outer member, said nonelastomeric inner member having an outer bonding cylindrical surface segment, bonding an elastomeric surface effect damper member to said nonelastomeric inner member outer bonding surface segment with said elastomeric surface effect damper member having an outer elastomer surface distal from said nonelastomeric inner member outer bonding surface segment, receiving said nonelastomeric inner member in said outer member inner axial center bore with said nonelastomeric inner member rotatable within said outer member with said elastomeric surface effect damper outer elastomer surface engaging said nonelastomeric outer member frictional interface inner surface segment and inhibiting an oscillating rotation of said nonelastomeric inner member.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE PREFERRED EMBODIMENTS

Figure 1:
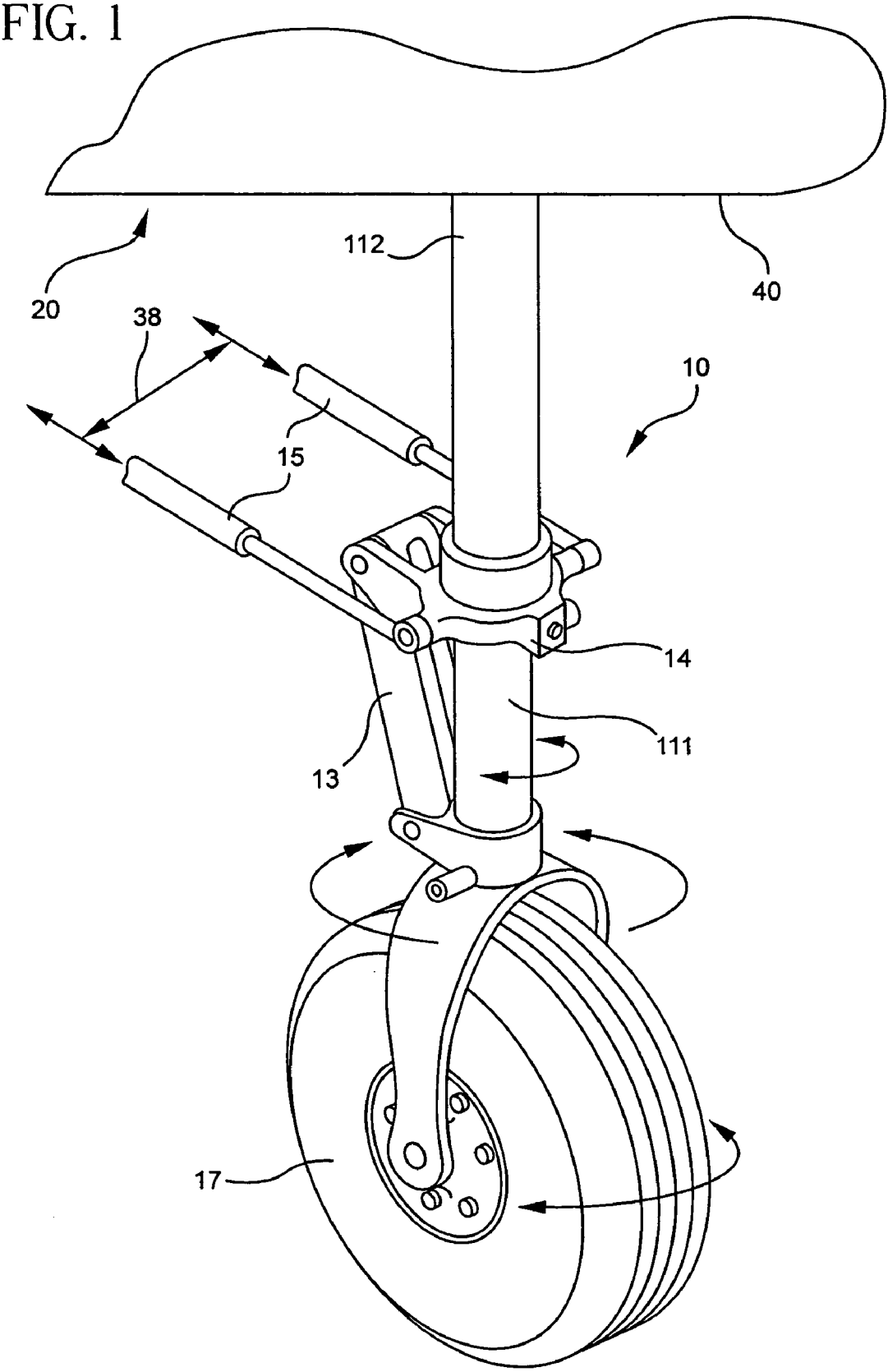
FIG. 1 shows an aircraft landing gear assembly for an aircraft.
Figure 2:
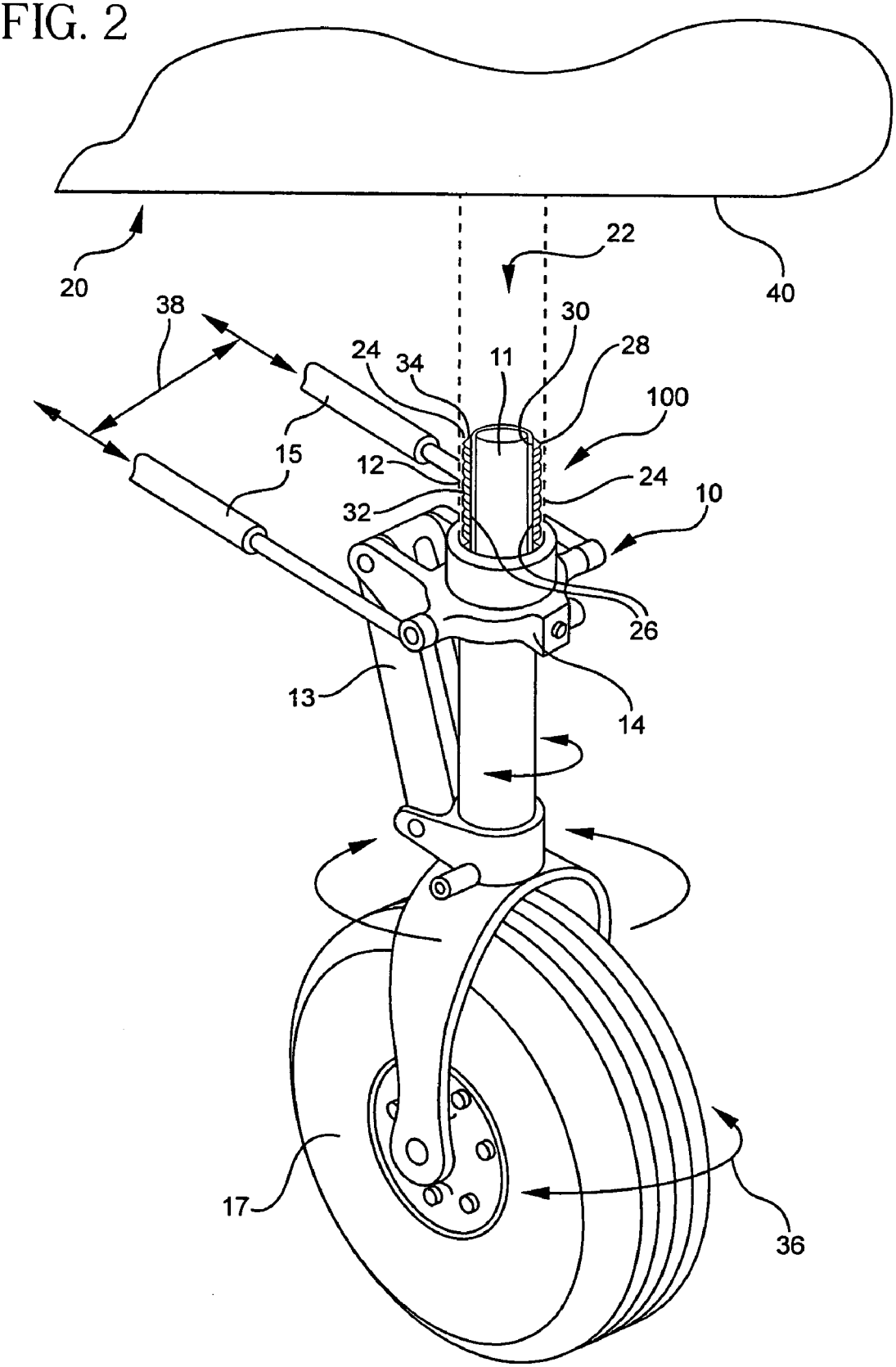
FIG. 2 shows an aircraft landing gear assembly with part of the vertical strut member ghosted with dotted lines to show the damper contained within.
Figure 3:
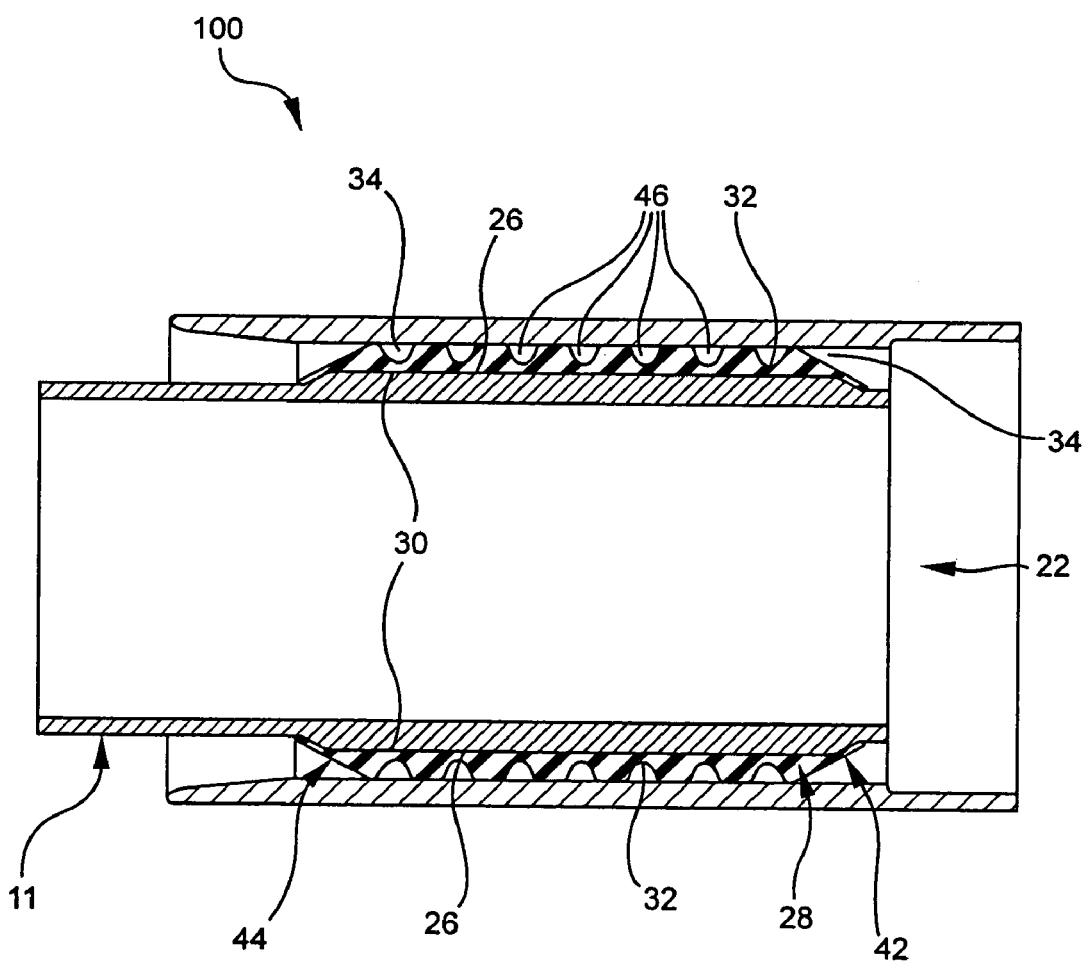
FIG. 3 shows a cross sectional view of a damper.
Figure 4:
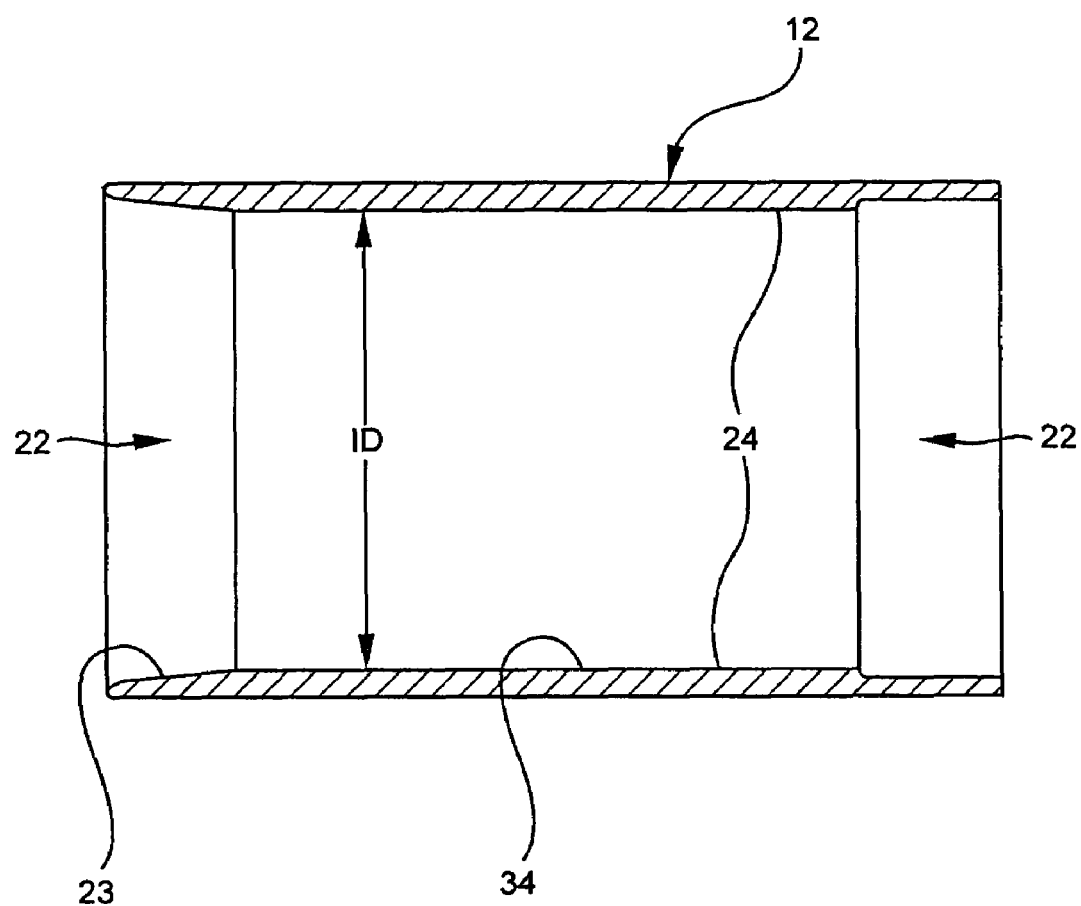
FIG. 4 shows the cross sectional view of the damper outer member.
Figure 5:
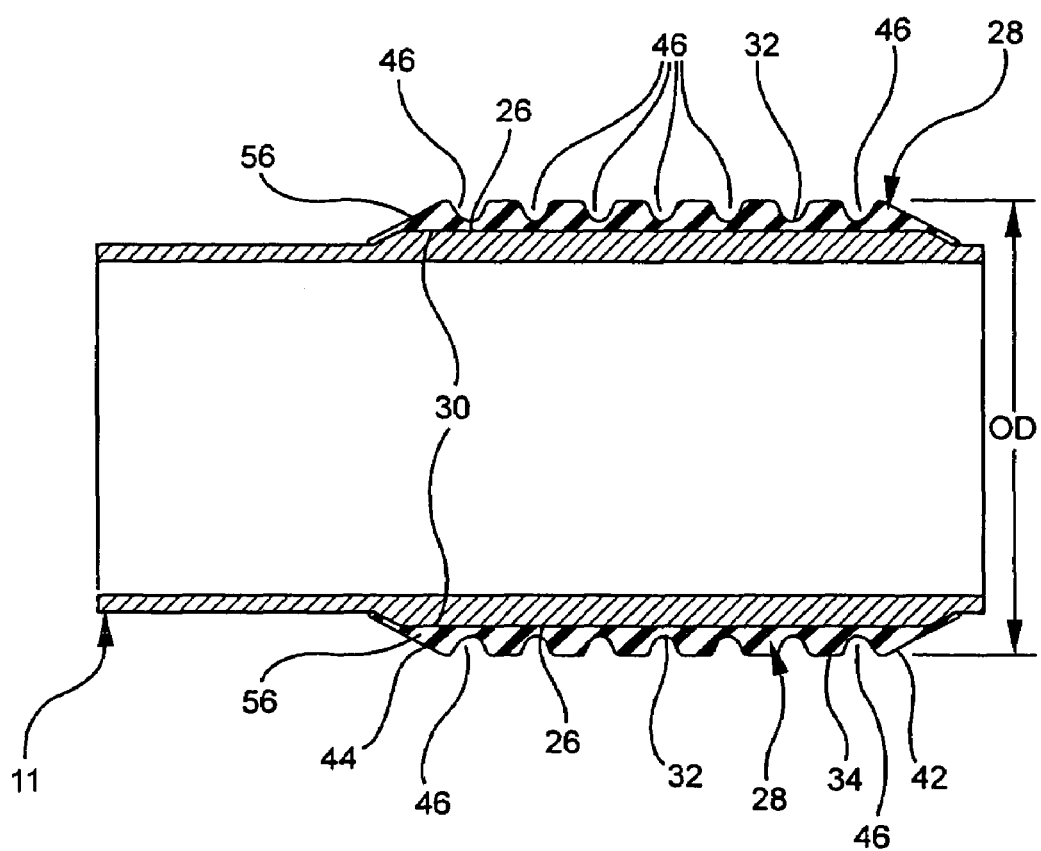
FIG. 5 shows the cross sectional view of the damper inner member.
Figure 6:
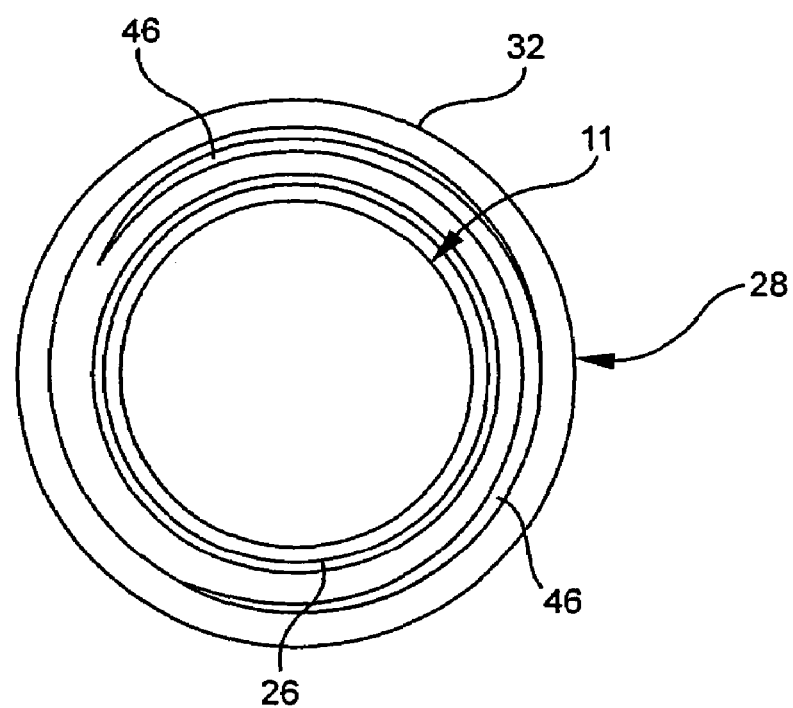
FIG. 6 shows an end view of the damper inner member.
Figure 7:
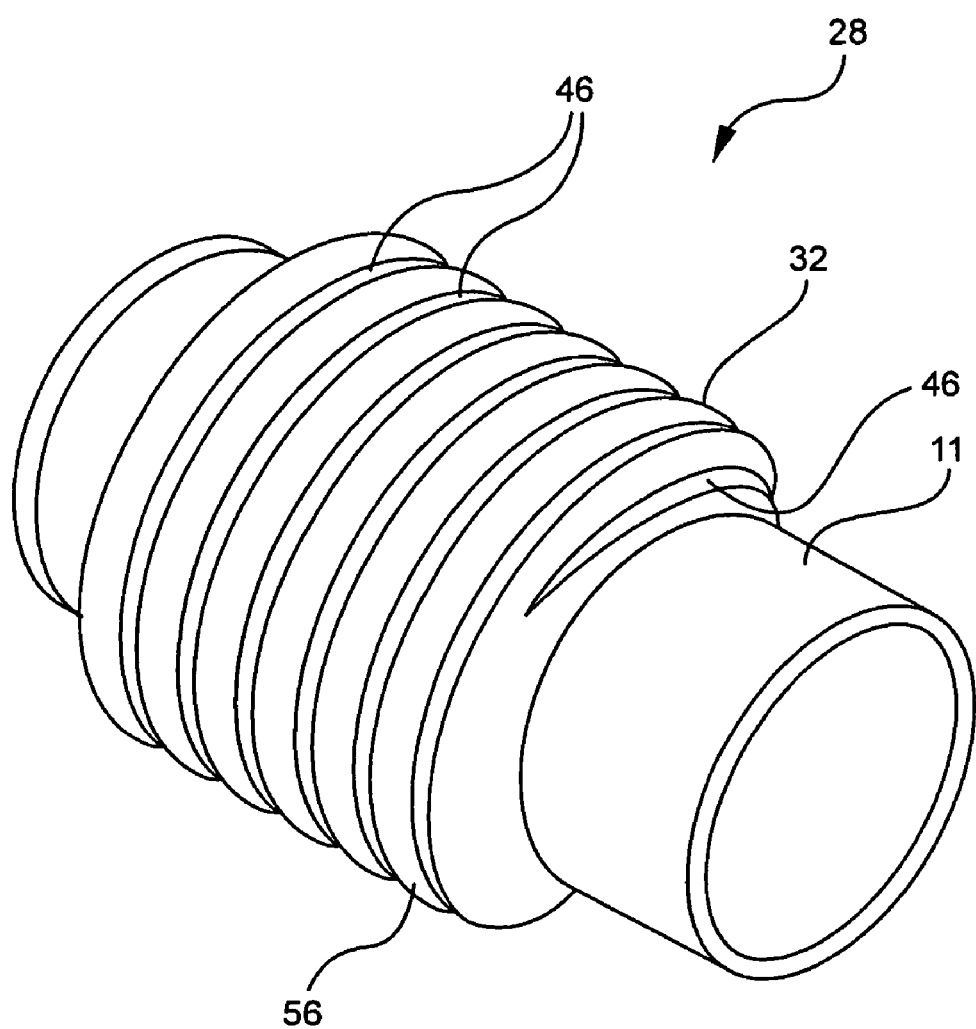
FIG. 7 shows a perspective view of the damper inner member.
Figure 8:
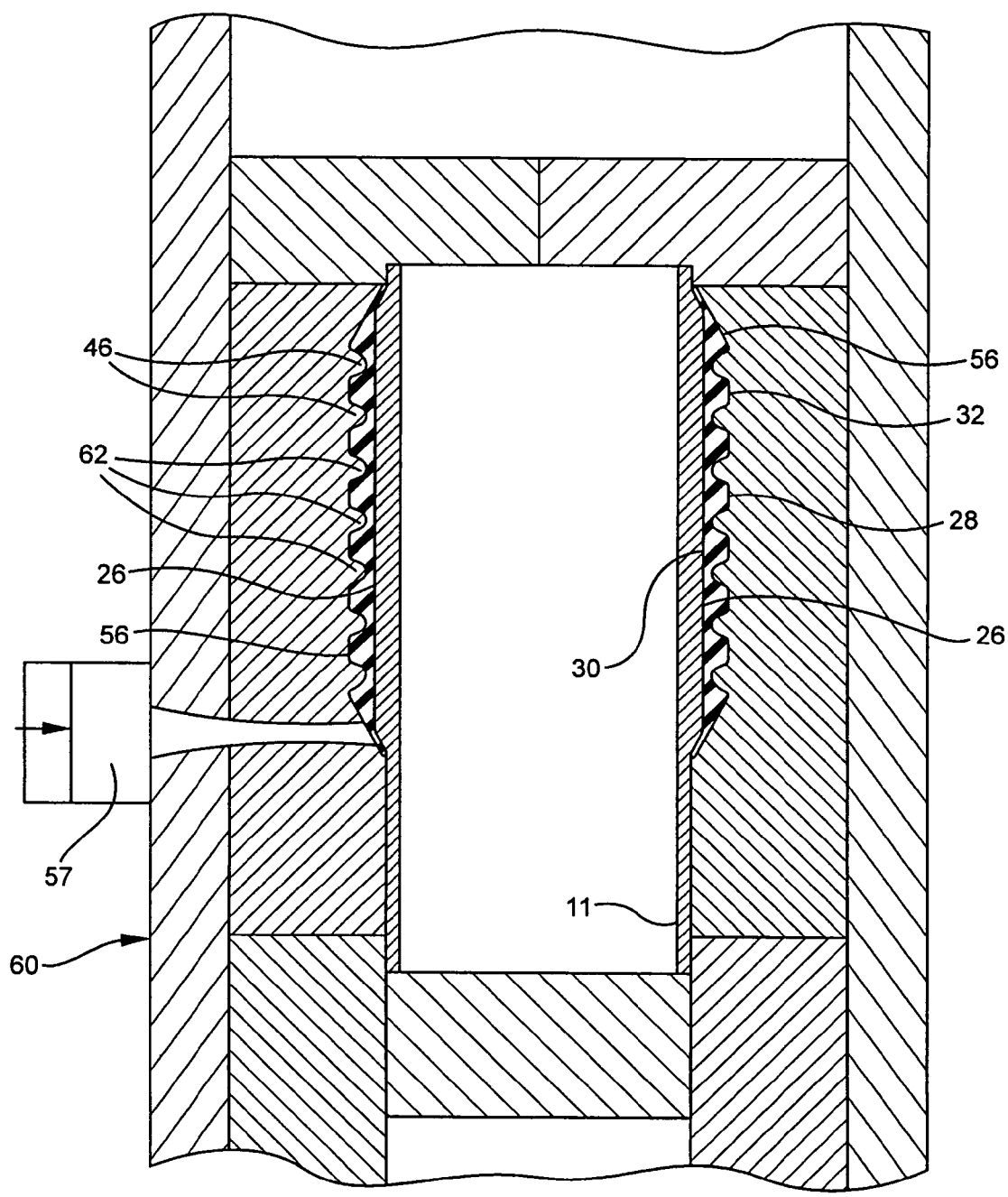
FIG. 8 shows a method of making a damper.
Figure 9:
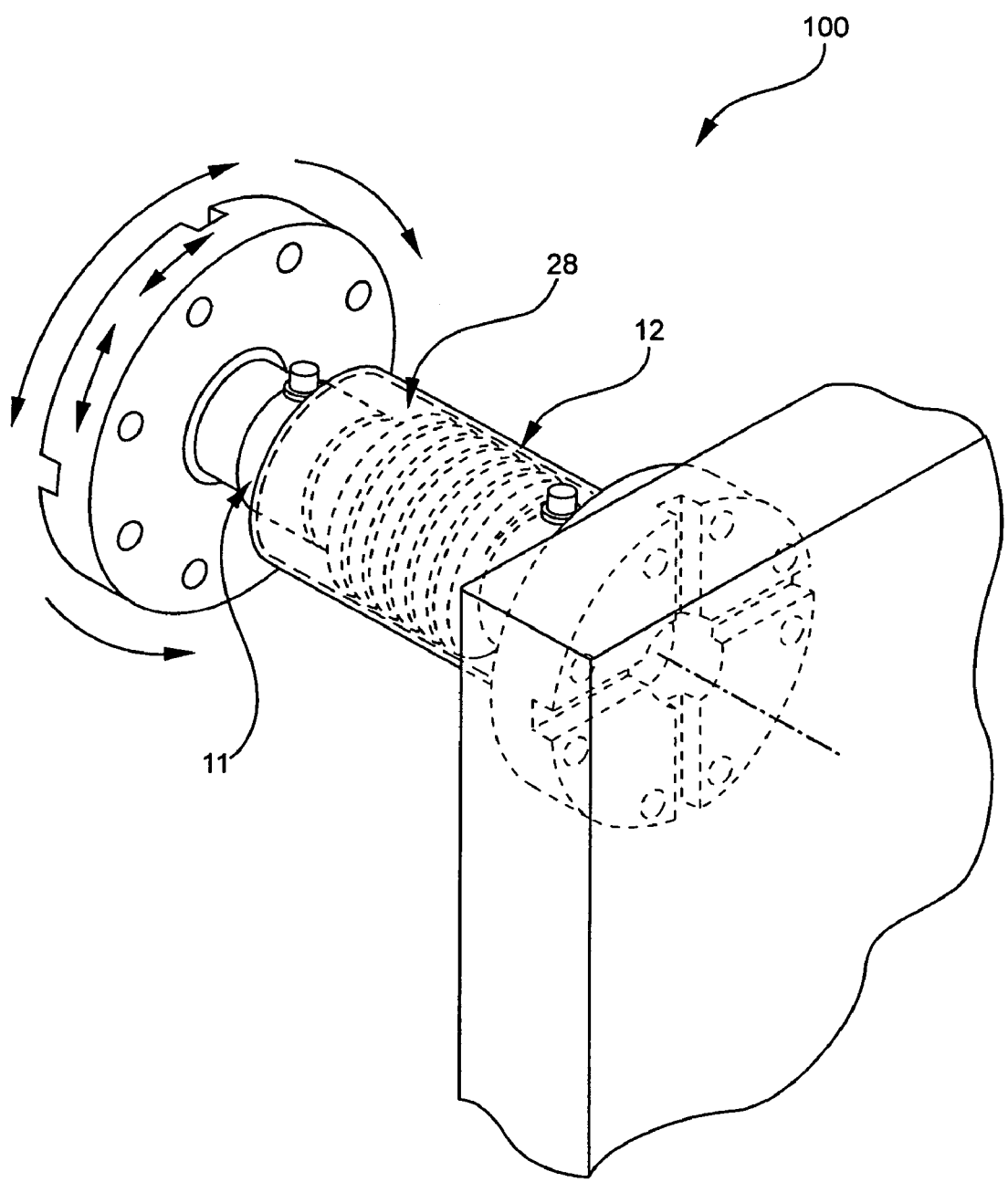
FIG. 9 shows a perspective view of a damper with parts of the damper inner member shown with dotted lines.
Figure 10:
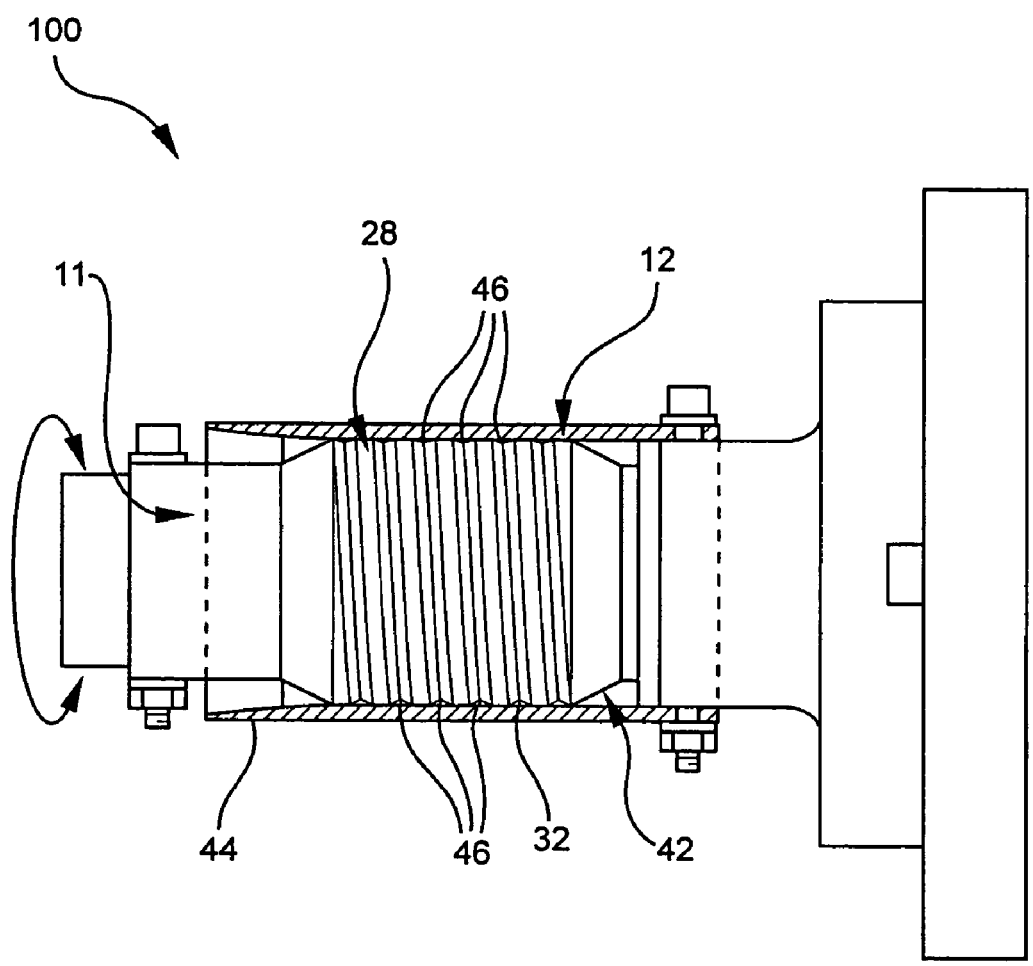
FIG. 10 shows a side view of a damper inner member with the cross sectional view of the damper outer member.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention includes an aircraft vehicular front landing gear assembly 10 for an aircraft 20. The landing gear assembly 10 is comprised of a nonelastomeric outer upper strut shaft tubular member 12 having an inner axial center bore 22 with a tubular cylindrical frictional interface inner surface segment 24. Preferably the nonelastomeric outer upper strut shaft tubular member 12 is comprised of a metal tube. The landing gear assembly 10 is comprised of a nonelastomeric inner lower strut shaft tubular member 11 having an outer bonding cylindrical surface segment 26 with the nonelastomeric inner lower strut shaft member rotationally received in the outer strut member inner axial center bore 22 with the nonelastomeric inner strut member 11 rotatable within the outer strut member 12. Preferably the nonelastomeric inner strut member 11 is comprised of a metal tube. The landing gear assembly 10 is comprised of an elastomeric surface effect damper member 28 encompassing the nonelastomeric inner strut member outer bonding cylindrical surface segment 26. The elastomeric surface effect damper member 28 has an inner bonding cylindrical surface segment 30 and an outer grooved elastomer surface 32. The elastomeric surface effect damper inner bonding surface segment 30 is bonded to the nonelastomeric inner strut member outer bonding surface segment 26. The landing gear assembly 10 includes a surface effect lubricant 34, the surface effect lubricant 34 disposed between the elastomeric surface effect damper outer grooved elastomer surface 32 and the nonelastomeric outer strut member frictional interface inner surface segment 24 with the elastomeric surface effect damper outer grooved elastomer surface 32 engaging the nonelastomeric outer strut member frictional interface inner surface segment 24 and inhibiting an oscillating shimmy rotation 36 of the nonelastomeric inner lower strut shaft member 11. Preferably the nonelastomeric inner lower strut shaft member 11 is grounded to a front nose wheel 17 with the rotation of nonelastomeric inner lower strut shaft member 11 tied and fixed to the steering rotation of the wheel 17, with the front nose wheel 17 and the nonelastomeric inner lower strut shaft member 11 rotationally actuated by a steering input 38, such as with steering tubes 15, steering collar 14, torque link 13, lower strut 111 and the nonelastomeric outer upper strut shaft member 12 is rotationally fixed to an aircraft nose front 40 such as with upper strut 112. Nonelastomeric outer upper strut shaft member 12 is rotationally fixed in that it does not rotate with steering input 38 and/or the front nose wheel 17 that is being turned side to side to steer the aircraft, such as during taxing and ground maneuvers by the aircraft 20. Nonelastomeric outer upper member 12 is tied and fixed to the structure of the aircraft nose front 40 such as through rotationally fixed upper strut 112, with nonelastomeric inner lower member 11 rotating relative to outer upper member 12. Preferably the elastomeric surface effect damper member outer grooved elastomer surface 32 has an upper end 42 and a distal lower end 44 with an elastomer surface groove 46 traversing the elastomer surface from the upper end 42 to the distal lower end 44, most preferably with groove 46 traversing the elastomer surface from the upper end to the distal lower end with the pattern of a helical spiral. Preferably the elastomeric surface effect damper member outer grooved elastomer surface 32 includes a helical spiral elastomer surface groove 46. Preferably the elastomeric surface effect damper member outer grooved elastomer surface 32 includes an elastomer surface groove 46.

The invention includes a method of making an aircraft vehicular front landing gear assembly 10. The method includes providing a nonelastomeric metal outer upper strut shaft tubular member 12 having an inner axial center bore 22 with a tubular cylindrical frictional interface inner surface segment 24. The method includes providing a nonelastomeric metal inner lower strut shaft tubular member 11 rotationally receivable in the outer strut member inner axial center bore 22 with the nonelastomeric inner strut member 11 rotatable within the outer strut member 12, with the nonelastomeric inner strut member 11 having an outer bonding cylindrical surface segment 26. The method includes bonding an elastomeric surface effect damper member 28 to the nonelastomeric inner strut member outer bonding cylindrical surface segment 26, with the elastomeric surface effect damper member 28 having an outer grooved elastomer surface 32 distal from the nonelastomeric inner strut member outer bonding surface segment 26. The method includes rotationally receiving the nonelastomeric inner lower strut shaft rotationally receivable member 11 in the outer strut member inner axial center bore 22 with the nonelastomeric inner strut member 11 rotatable within the outer strut member 12 with the elastomeric surface effect damper outer grooved elastomer surface 32 engaging the nonelastomeric outer strut member frictional interface inner surface segment 24 and inhibiting an oscillating shimmy rotation 36 of the nonelastomeric inner lower strut member 11. Preferably the method includes molding the elastomeric surface effect damper member 28 onto the nonelastomeric inner strut member outer bonding cylindrical surface segment 26. Preferably the method includes providing an elastomeric surface effect damper member mold 60 for receiving the nonelastomeric inner strut member 11, providing an elastomer 56, and molding the elastomer 56 to the nonelastomeric inner strut member 11 inside the mold 60. Preferably the elastomer 56 is comprised of a natural rubber elastomer. In an embodiment the elastomer 56 is comprised of a silicone elastomer. Preferably the mold 60 includes an outer surface groove relief 62 distal from the nonelastomeric inner strut member outer bonding surface segment 26, preferably the groove relief 62 traversing the elastomer mold cavity surface to provide for a groove 46 traversing the elastomer surface from the upper end 42 to the distal lower end 44, preferably a helical spiral elastomer surface groove 46 from the upper end to the distal lower end. In an embodiment molding includes providing an elastomer transfer stock 57, and transferring the elastomer transfer stock 57 under a pressure into the mold 60, such as through a sprue with the mold comprising close fitting steel metal pieces clamped in place, and vulcanizing curing the elastomer 56 inside the mold 60 under a molding pressure, preferably a molding pressure of at least 1000 psi. Preferably providing the nonelastomeric outer upper strut shaft tubular member 12 includes providing a nonelastomeric outer tubular member 12 with a tubular cylindrical frictional interface inner surface segment 24 having an inside diameter ID, and bonding an elastomeric surface effect damper member to the nonelastomeric inner strut member outer bonding cylindrical surface segment includes bonding an elastomeric surface effect damper member 28 to the nonelastomeric inner strut member outer bonding surface segment 26 to provide a bonded elastomeric surface effect damper member 28 having an outer grooved elastomer surface 32 with an outside diameter OD, with the elastomeric surface effect damper member outer grooved elastomer surface outside diameter OD greater than the nonelastomeric outer upper strut tubular member frictional interface inner surface segment inside diameter ID. Preferably the inside diameter ID of nonelastomeric outer tubular member 12 and the unreceived surface effect damper outside diameter OD of surface effect damper member 28 have a ratio ID/OD$\geq$0.75, preferably ID/OD$\geq$0.80, preferably ID/OD$\geq$0.85, preferably ID/OD$\geq$0.90, preferably ID/OD$\geq$0.92, most preferably ID/OD is in the range of 0.90 to 0.99, preferably with the surface effect damper elastomer having a compression strain less than 10%, prefer less than 8%, preferably less than 7.75% when received inside said nonelastomeric outer tubular member 12. Preferably the nonelastomeric outer tubular member 12 has a funnel end 23 with a progressively increasing inside diameter to facilitate reception of the nonelastomeric inner strut member 11 with surface effect damper member 28 inside outer tubular member 12. Preferably after reception of nonelastomeric inner strut member 11 with surface effect damper member 28 inside outer tubular member 12 the relative axial movement of nonelastomeric inner strut member 11 with surface effect damper member 28 along inner axial bore 22 is minimal in that relative axial stroking is minimized. The method includes providing a friction reducing lubricant 34 between the elastomeric surface effect damper outer grooved elastomer surface 32 and the nonelastomeric outer strut member frictional interface inner surface segment 24. Preferably a friction reducing lubricant grease is disposed between the surfaces, preferably a grease containing a fluorocarbon. Preferably the friction reducing lubricant 34 between the elastomeric surface effect damper outer grooved elastomer surface 32 and the nonelastomeric outer strut member frictional interface inner surface segment 24 is comprised of a silicone lubricant.

The invention includes method of making a shimmy damper 100 for damping a rotating oscillation 36. The method includes providing a nonelastomeric outer upper tubular member 12 having an inner axial center bore 22 with a tubular cylindrical frictional interface inner surface segment 24. The method includes providing a nonelastomeric inner lower shaft member 11 rotationally receivable in the outer member inner axial center bore 22 with the nonelastomeric inner member 11 rotatable within the outer member 12, with the nonelastomeric inner member 11 having an outer bonding cylindrical surface segment 26. The method includes bonding an elastomeric surface effect damper member 28 to the nonelastomeric inner member outer bonding cylindrical surface segment 26, with the elastomeric surface effect damper member 28 having an outer grooved elastomer surface 32 distal from the nonelastomeric inner member outer bonding cylindrical surface segment 26. The method includes rotationally receiving the nonelastomeric inner member 11 in the outer member inner axial center bore 22 with the nonelastomeric inner member 11 rotatable within the outer member 12 with the elastomeric surface effect damper outer grooved elastomer surface 32 engaging the nonelastomeric outer member frictional interface inner surface segment 24 and inhibiting an oscillating shimmy rotation 36 of the nonelastomeric inner member 11.

The invention includes a shimmy damper 100 for damping a rotating oscillation 36. The shimmy damper 100 is comprised of a nonelastomeric metal outer upper tubular member 12 having an inner axial center bore 22 with a tubular cylindrical frictional interface inner surface segment 24. The shimmy damper 100 is comprised of a nonelastomeric metal inner lower member 11 having an outer bonding cylindrical surface segment 26, the nonelastomeric inner member 11 rotationally received in the outer member inner axial center bore 22 with the nonelastomeric inner member 11 rotatable within the outer tubular member 12. The shimmy damper 100 is comprised of an elastomeric surface effect damper member 28 encompassing the nonelastomeric inner member outer bonding cylindrical surface segment 26, with the elastomeric surface effect damper member 28 having an inner bonding cylindrical surface segment 30 and an outer grooved elastomer surface 32. The elastomeric surface effect damper inner bonding cylindrical surface segment 30 is bonded to the nonelastomeric inner member outer bonding cylindrical surface segment 26. The shimmy damper 100 is comprised of a surface effect lubricant 34 disposed between the elastomeric surface effect damper outer grooved elastomer surface 32 and the nonelastomeric outer member frictional interface inner surface segment 24 with the elastomeric surface effect damper outer grooved elastomer surface 32 engaging the nonelastomeric outer member frictional interface inner surface segment 24 and inhibiting an oscillating shimmy rotation of the nonelastomeric inner member.

The invention includes a method of making a rotating oscillation damper 100 for damping a rotating oscillation 36. The method includes providing a nonelastomeric metal outer tubular member 12 having an inner axial center bore 22 with a tubular cylindrical frictional interface inner surface segment 24 and providing a nonelastomeric metal inner member 11 rotationally receivable in the outer member inner axial center bore 22 with the nonelastomeric inner member 11 rotatable within the outer member 12. The nonelastomeric inner member 11 has an outer bonding cylindrical surface segment 26, and the method includes providing an elastomeric surface effect damper member mold 60 for receiving the nonelastomeric inner member 11, with the mold including an outer surface groove relief 62 distal from the nonelastomeric inner member outer bonding cylindrical surface segment 26, preferably with the groove relief traversing the elastomer surface mold cavity from an upper end 42 to a distal lower end 44. Preferably the outer surface groove relief 62 has a helical spiral pattern for producing an elastomer surface groove 46. The method includes providing an elastomer 56 and molding the elastomer to the nonelastomeric metal inner member 11 inside the mold 60 to provide a an elastomeric surface effect damper member 28 bonded to the nonelastomeric inner member outer bonding cylindrical surface segment 26, with the elastomeric surface effect damper member 28 having an outer grooved elastomer surface 32 distal from the nonelastomeric inner member outer bonding cylindrical surface segment. The method includes receiving the nonelastomeric inner member 11 in the outer member inner axial center bore 22 with the nonelastomeric inner member 11 rotatable within the outer member 12 with the elastomeric surface effect damper outer grooved elastomer surface 32 engaging the nonelastomeric outer member frictional interface inner surface segment 24 and inhibiting an oscillating rotation 36 of the nonelastomeric inner member 11.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. An aircraft landing gear assembly, said landing gear assembly comprised of a nonelastomeric outer aircraft landing gear vertical strut member having an inner axial center bore with a frictional interface inner surface segment, a nonelastomeric inner aircraft landing gear vertical strut member having an outer bonding surface segment, said nonelastomeric inner aircraft landing gear vertical strut member rotationally received in said outer aircraft landing gear vertical strut member inner axial center bore with said nonelastomeric inner aircraft landing gear vertical strut member rotatable within said outer aircraft landing gear vertical strut member, and an elastomeric surface effect damper member encompassing said nonelastomeric inner aircraft landing gear vertical strut member outer bonding surface segment, said elastomeric surface effect damper member having an inner bonding surface segment and an outer grooved elastomer surface, said elastomeric surface effect damper inner bonding surface segment bonded to said nonelastomeric inner aircraft landing gear vertical strut member outer bonding surface segment, and a surface effect lubricant, said surface effect lubricant disposed between said elastomeric surface effect damper outer grooved elastomer surface and said nonelastomeric outer aircraft landing gear vertical strut member frictional interface inner surface segment with said elastomeric surface effect damper outer grooved elastomer surface engaging said nonelastomeric outer aircraft landing gear vertical strut member frictional interface inner surface segment and inhibiting an oscillating shimmy rotation of said nonelastomeric inner aircraft landing gear vertical strut member.

2. An aircraft landing gear assembly as claimed in claim 1, wherein said nonelastomeric inner aircraft landing gear vertical strut member is grounded to a front nose wheel with said front nose wheel and said nonelastomeric inner aircraft landing gear vertical strut member rotationally actuated by a steering input and said nonelastomeric outer aircraft landing gear vertical strut member rotationally fixed to an aircraft nose front.

3. An aircraft landing gear assembly as claimed in claim 1, wherein said elastomeric surface effect damper member outer grooved elastomer surface has an upper end and a distal lower end with an elastomer surface groove traversing said elastomer surface from said upper end to said distal lower end.

4. An aircraft landing gear assembly as claimed in claim 1, wherein said elastomeric surface effect damper member outer grooved elastomer surface has an upper end and a distal lower end with a helical elastomer surface groove traversing said elastomer surface from said upper end to said distal lower end.

5. An aircraft landing gear assembly as claimed in claim 1, wherein said elastomeric surface effect damper member outer grooved elastomer surface includes a helical elastomer surface groove.

6. An aircraft landing gear assembly as claimed in claim 1, wherein said elastomeric surface effect damper member outer grooved elastomer surface includes an elastomer surface groove.

* * * * *